July 31, 1945.  G. R. BROWN  2,380,722
METHOD OF AND APPARATUS FOR MAKING ARTICLES
Filed March 5, 1942
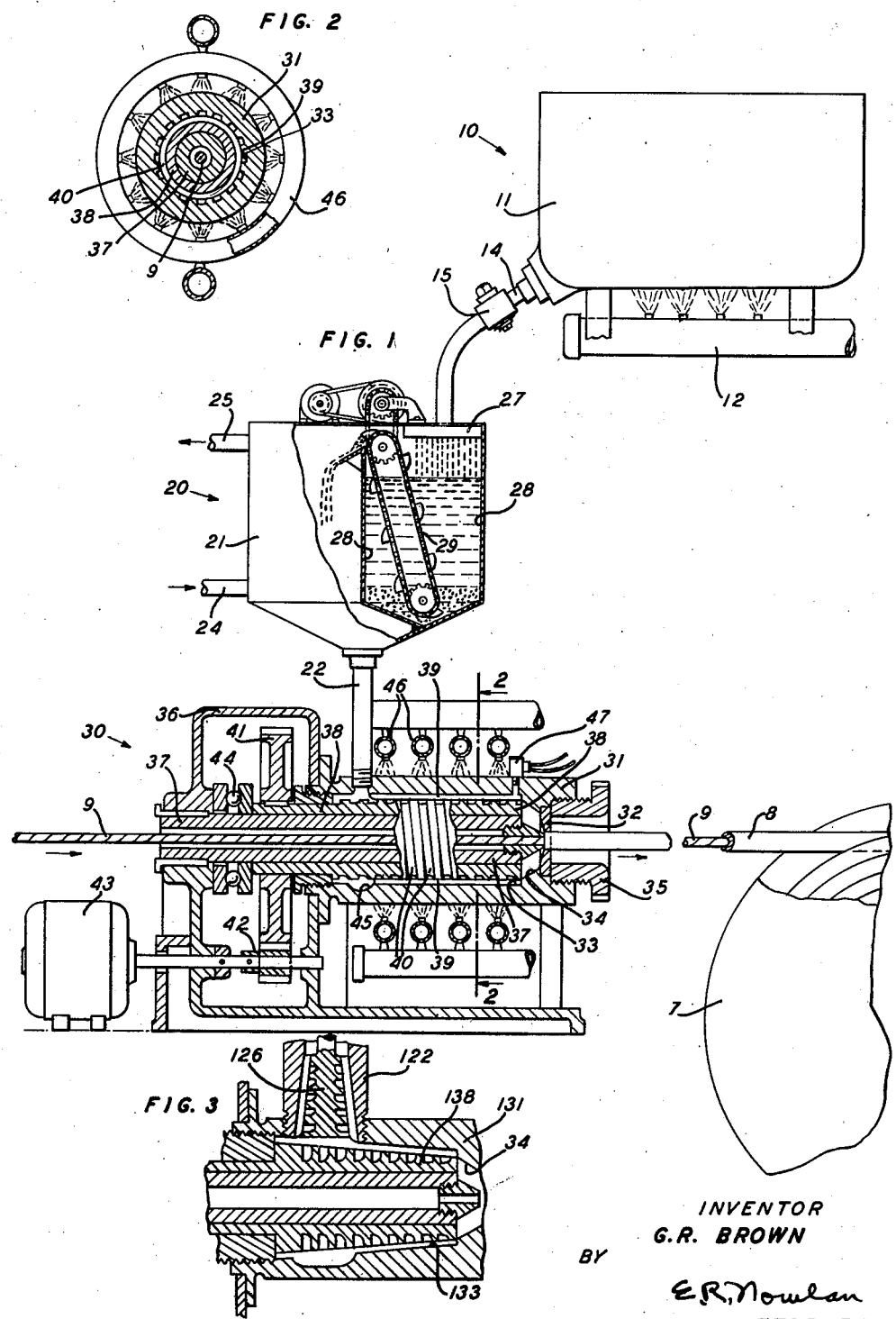
INVENTOR
G. R. BROWN
BY
E. R. Nowlan
ATTORNEY Patented July 31, 1945

2,380,722

UNITED STATES PATENT OFFICE 2,380,722

METHOD OF AND APPARATUS FOR MAKING ARTICLES

George R. Brown, Newark, N. J., assignor to Western Electric Company, Incorporated, New York, N. Y., a corporation of New York Application March 5, 1942, Serial No. 433,490

10 Claims. (Cl. 207—1)

This invention relates to a method of and apparatus for making an article, and more particularly to a method of and apparatus for sheathing an electrical conductor cable or other strand-like core with a continuously formed seamless sheath of metallic alloy, especially of one or another suitable alloy of lead.

Electrical conductor cables have been sheathed in lead, satisfactorily in most instances heretofore, by passing the cable core through appropiate apertures in the cylinder of an extrusion press while a hydraulically driven piston caused lead or lead alloy in the cylinder to be extruded through a suitable die as a circumferentially seamless, substantially uniform sheath about the advancing core. At the end of a piston stroke, the advance of the core is halted, the piston retired from the cylinder, a new charge of molten lead or alloy poured into the cylinder and cooled to extrusion temperature, the piston reinserted, and the procedure repeated as many times as necessary to sheath a length of core. In such a process it is necessary to use considerable care in order that the weld of each charge extruded to the preceding one shall be clean, complete and perfect in order that the sheath may be seamless along the core as well as around it.

Generally, in the past, alloys of lead hardened with a small addition of antimony have been satisfactorily employed in such procedure and apparatus as just described. However, the use of lead with a minor percentage of calcium as hardening agent has of late been found to offer advantages over the antimony alloy of lead. However, when it is sought to use the process and apparatus outlined above for sheathing with calcium-lead certain difficulties may appear. Seemingly the eutectic of this alloy or other segregations form in a slowly congealing mass of the alloy quite rapidly. Hence in the case of sheaths of this material so formed it may be difficult to avoid a troublesome lack of homogeneity.

An object of the present invention is to provide a method of and apparatus for forming on cable cores and the like, continuously formed sheaths of extrudable metals and alloys, and especially of lead hardened with calcium, of improved and unusually great homogeneity both longitudinally and circumferentially.

With the above and other objects in view, the invention may be embodied in a method comprising steps of and in an apparatus having means for forming a molten body of suitable sheathing metal, finely dividing and chilling the finely divided metal in a reducing or non-oxidizing atmosphere too rapidly for any eutectic to form in the solidified particles, warming the powdered metal to extrusion temperature without melting the same out of contact with oxygen, and extruding the oxide free, powdered, warmed metal around an advancing core to form a seamless sheath thereon.

Other objects and features of the invention will appear from the following detailed description of one embodiment thereof taken in connection with the accompanying drawing in which the same reference numerals are applied to identical parts in the several figures and in which Fig. 1 is a diagrammatic view in elevation and partly in detailed section of an apparatus constructed in accordance with the invention;

Fig. 2 is a section on the line 2—2 of Fig. 1, and

Fig. 3 is a partial view similar to Fig. 1 of a modified form.

As herein disclosed, the invention is illustrated by an apparatus for creating on a cable core a circumferentially and longitudinally seamless and continuously homogeneous sheath of lead or lead alloy, especially of calcium-lead. The apparatus comprises three principal general units, a melting kettle indicated generally at 10, a metal powdering unit generally indicated at 20, and a sheathing apparatus proper generally indicated at 30. A cable core 9 advances through the apparatus 30 from some supply (not shown) at the left and after receiving the sheath 8 is taken up by any suitable means such as a reel 7.

The unit 10 needs little description, being simply an ordinary melting kettle 11 with heating means such as a gas burner 12. Means are provided, such as a discharge pipe 14, to carry away molten metal from the bottom of the kettle under control of some suitable means such as a valve 15. These latter means must be arranged to draw molten metal from the melt in the kettle, from below the surface of the melt in such fashion that no dross or oxidized material from the surface is passed on from the kettle. It may also be preferable to keep the surface of the melt covered with a protective melt or slag, or with a layer of broken charcoal or other protective or reducing agent as is frequently done where lead, tin or alloys of like metals are melted.

The unit 20 has for its purpose the conversion of the molten metal received from the kettle, into a finely divided solid state without effecting or permitting any oxidation. The particular structure and mode of operation or process employed to this end in the unit 20 form no part of the present invention. Various methods and apparatus for this purpose are discussed and described in a publication entitled "Paper presented at Powder Metallurgy Conference," published in 1940 by the Department of Metallurgy of the Massachusetts Institute of Technology. If desired reference may be had to this publication for a description of suitable procedures and means for the unit 20. Preferably the unit will be enclosed in a housing 21 having a discharge pipe 22 and receiving the pipe 14 of the kettle. The atmosphere within the housing will preferably be non-oxiding or reducing. It may be kept so by any suitable means, e. g. gas inlet 24 and gas outlet 25, for keeping the housing filled with suitable gas or gases such as nitrogen or hydrogen.

While the particular method and apparatus employed at 20 to reduce the molten alloy to solid powder form no part of the present invention, this may be accomplished, for example, by pouring the molten metal into a suitably fine-meshed sieve 27, the minute drops from which fall into a tank 28 of cold water. The dust shot so formed may be lifted by suitable means, e. g. a bucket or other conveyor 29, to be allowed to fall through an upblast of non-oxidizing gas, and so to enter the tube 22 or 122.

The unit 30 is shown and described in detail since it is here that the crucial step of the process is effected. In this unit, a stationary extrusion block or die block 31 has an extrusion die 32 mounted therein at the forward end of a generally cylindrical chamber 33 formed in the block 31 and which tapers narrowingly to the die as shown at 34. The die is removably but rigidly held in the block by a centrally apertured locking member 35 threaded into the block. A stationary housing 36 encloses and extends rearwardly out beyond the rear end of the block 31. A cylindrical, axially bored core guide 37 is supported by and keyed to the housing to extend coaxially forward through most of the length of the chamber 33. An extrusion screw 38 in the form of a sleeve rotatable on the core guide 37 is positioned in the annular space between the core guide in the chamber 33 and the chamber wall of the block 31. The wall is formed with longitudinal radially inwardly extending ribs 39 which guide and support the threaded portion 40 of the screw 38 externally. On the rear end of the screw 38, and within the housing 36, is rigidly mounted a large gear 41 driven by a pinion 42 driven in turn by a motor 43. The longitudinal rearward thrust of the extension screw 38 is taken by an antifriction bearing 44. The chamber 33 is widened near its rear end to form an annular material receiving recess 45 with which the delivery pipe 22 of the unit 20 communicates. Means, such as encircling gas flame rings 46, are provided, to heat the block 31, and temperature reporting means 47, to enable a proper control of the temperature of the material in the chamber 33. Suitable means for this last purpose are disclosed and described in U. S. Patent 2,266,416, issued December 16, 1941, to A. J. N. Duclos, to which reference may be had for detailed description if desired. It is sufficient for the present purposes to note that the device 47 reports directly the temperature of the material in the chamber, not the temperature of the chamber wall.

The method and apparatus of the invention have particular applicability to the sheathing of electrical cable cores with calcium-lead alloys. A particularly suitable alloy for this purpose is one consisting of from 0.02% to 0.04% calcium and the balance lead except for harmless impurities. This alloy and its advantages for the present purpose are particularly disclosed and described in U. S. Patents Nos. 1,890,013 and 1,890,014, issued December 6, 1932, to R. S. Dean. Although the present invention has particular applicability to the use of this material, the invention is not so limited but also possesses advantages over prior methods when applied to lead, other alloys of lead and other metallic materials. The invention may be applied also, besides to the sheathing of electrical conductor cables, to the manufacture of other articles, pipes, tubes, rods and the like.

In operation, a suitable alloy for sheathing cable is prepared by melting the ingredients (e. g. lead with sufficient calcium to produce an alloy of about 0.03% calcium and the balance substantially lead) at a sufficient temperature and for a sufficient time in the kettle 11, to produce a stable and uniform dispersion or solution of the calcium in the lead. The molten alloy is transferred from the kettle, by drawing it off from near the bottom, without contact with the air, to the unit 20, where it is chilled and granulated or minutely divided and solidified, e. g. by any of the customary means of making very fine shot. This part of the process is carried on under non-oxidizing or reducing conditions to avoid any oxidation of the finely divided alloy, for example by enclosing all apparatus and handling means connected with this part of the process in the closed housing 21 kept filled with nitrogen, hydrogen or other suitable gas. Thus the surfaces of the particles of metal formed are kept bright and unaltered.

The powdered, unoxidized metal is fed through the delivery pipe 22 into the annular recess 45 in the die block 31 and surrounding the rear end of the extrusion screw 38. The screw being rotated (clockwise in Fig. 2), the metal powder entering between the turns of its thread is forced forward (to the right in Fig. 1) and thus gradually consolidated and compressed. The residual gas between the particles is squeezed out. The plastic material is also squeezed up between the longitudinal ribs 39 on the inside wall of the die block. As the mass consolidates, the ribs 39 prevent it from rotating with the screw and thus enable the screw to drive the material forward. At the same time the block 31 is heated by the gas flame from the rings 46 to bring the consolidating metal to a predetermined plastifying temperature as reported by the device 47. This temperature will vary with the particular metal in question. In the case of lead with about 0.02% calcium, it is preferably about 400° F. At this temperature the calcium-lead alloy is sufficiently plastic that the particles will weld satisfactorily into a completely homogeneous mass, and extrude smoothly through the die 32 as a continuous sheath 8 about the core 9, which will be seamless both circumferentially and longitudinally of the core, with all residual gas entirely squeezed out. At the same time, at this temperature no harmful segregation occurs in the alloy, since this extrusion temperature is considerably below that at which a eutectic is formed or other segregation can take place. It is a particular characterizing feature of the procedure that once the homogeneous alloy has been created in the kettle 11 and chilled to solidity in the device 20, it is never again heated to a temperature at which harmful segregation can occur. This is a matter of particular importance in connection with calcium-lead alloys. It is a difficult matter to form longitudinally homogeneous sheaths of these alloys by the older methods in which prepared alloy is melted in a kettle, poured molten into the cylinder of a plunger or ram type extrusion press or into the block of a screw press such as shown in Fig. 3, and there allowed to cool to the extrusion temperature before being extruded. In such case segregation, especially of the eutectic, is hard to prevent, in calcium-lead alloys, during the relatively slow solidification of the material. Furthermore, in the intermittently operating ram or plunger presses, there is left a solid slug of solidified metal in the cylinder at the end of each stroke, to be partially melted and welded to the next charge of molten metal. During the wait in the hot cylinder while the next charge is being poured and cooled, the metal of the slug is particularly apt to suffer segregation. This is the first metal extruded at the next stroke of the press and forms a ring or stretch of material in the sheath of character different from what precedes and follows it, as well as being inhomogeneous in itself and thus forms a circumferential seam, ring or band of material in the sheath, of inferior character.

These older methods are ordinarily entirely satisfactory for many metals, especially the antimony-lead alloys commonly used for cable sheathing. While the present invention is particularly advantageous in the case of calcium-lead and the like alloys which do or may give difficulty because of segregation, the invention also offers advantages when antimony-lead and the like metals are in question, in that there is no problem of welding successive batches or charges of sheathing metal together, since the process as described above is continuous and limited only by the length of the core to be sheathed.

In the case of some lead alloys, the finely divided material may have physical characteristics rendering it troublesome to handle, particularly in the transfer from the powdering means 20 to and into the extrusion chamber 33. The stuff is "squashy" and seems to have considerable friction on or even adhesion to surfaces over which it is moved. Hence to avoid clogging, it may be preferable to modify the apparatus illustrated at 30 in Fig. 2, somewhat in the manner disclosed in Fig. 3. Here the transfer pipe 122 is increasingly larger in bore from the unit 20 toward the apparatus 30, and a correspondingly formed screw 126, in the tapering bore and driven by any suitable means not shown, may be provided to advance the material down the pipe. Similarly, it may be well to make the extrusion chamber 133 of progressively smaller diameter from rear to front, and to form the extrusion screw 138 with a correspondingly tapered, conical outline, and with threads of diminishing depth to increase the pressure effect progressively.

No separate means are shown to advance the core through the press unit 30, since the operation of extruding the sheath on the core itself effects the advance of the core, so that the unit 30 is not only means to sheathe the core but also means to simultaneously advance the core.

The disclosure herein is illustrative and may be variously altered and modified without departing from the spirit and scope of the invention as described and pointed out in the appended claims.

What is claimed is:

1. The method of forming an elongated metal article of continuous homogeneity of substance which comprises steps of forming a molten body of a lead alloy capable of segregation, forming the molten metal into oxide free solid particles chilled too rapidly for segregation to occur in the substance thereof, heating the particles to a plastifying temperature too low to effect segregation therein, and forming and uniting the heated particles by continuous extrusion under pressure into a continuously homogeneous elongated article.

2. An apparatus for forming an elongated metal article of continuous homogeneity of substance which comprises means to form a molten body of a lead alloy capable of segregation, means to form the molten metal into oxide free solid particles chilled too rapidly for segregation to occur in the substance thereof, and means to heat the particles to a plastifying temperature too low to effect segregation therein, in combination with means to form and unite the heated particles by continuous extrusion under pressure into a continuously homogeneous elongated article.

3. The method of forming a circumferentially and longitudinally seamless and homogeneous sheath upon a core which comprises steps of forming a molten body of a lead alloy capable of segregation, forming the molten metal into oxide free solid particles chilled too rapidly for segregation to occur in the substance thereof, heating the particles to a plastifying temperature too low to effect segregation therein, and advancing a core longitudinally and simultaneously forming and uniting the heated particles by continuous extrusion under pressure into a continuously homogeneous sheath about the advancing core.

4. An apparatus for forming a circumferentially and longitudinally seamless and homogeneous sheath upon a core which comprises means to form a molten body of a lead alloy capable of segregation, means to form the molten metal into oxide free solid particles chilled too rapidly for segregation to occur in the substance thereof, and means to heat the particles to a plastifying temperature too low to effect segregation therein, in combination with continuously operating means to advance a core and to simultaneously form and unite the heated particles by continuous extrusion under pressure into a continuously homogeneous elongated article.

5. The method of forming a circumferentially and longitudinally seamless and homogeneous sheath upon a core which comprises steps of forming a molten body of a lead alloy capable of segregation, forming the molten metal into oxide free solid particles chilled too rapidly for segregation to occur in the substance thereof, heating the particles to a plastifying temperature too low to effect segregation therein, and advancing a core longitudinally and simultaneously forming and uniting the heated particles by continuous extrusion under pressure into a continuously homogeneous sheath about the advancing core, the steps of forming the molten metal into particles and of forming the particles into the sheath being carried on with exclusion of oxygen from contact with the particles.

6. The method of forming a circumferentially and longitudinally seamless and homogeneous sheath upon a core which comprises steps of forming a molten body of a lead alloy capable of segregation, forming the molten metal into oxide free solid particles chilled too rapidly for segregation to occur in the substance thereof, heating the particles to a plastifying temperature too low to effect segregation therein, and advancing a core longitudinally and simultaneously forming and uniting the heated particles by continuous extrusion under pressure into a continuously homogeneous sheath about the advancing core, the steps of forming the molten metal into particles and of forming the particles into the sheath being carried on in a non-oxidizing atmosphere.

7. The method of forming a circumferentially and longitudinally seamless and homogeneous sheath upon a core which comprises steps of forming a molten body of a lead alloy capable of segregation, forming the molten metal into oxide free solid particles chilled too rapidly for segregation to occur in the substance thereof, heating the particles to a plastifying temperature too low to effect segregation therein, and advancing a core longitudinally and simultaneously forming and uniting the heated particles by continuous extrusion under pressure into a continuously homogeneous sheath about the advancing core, the steps of forming the molten metal into particles and of forming the particles into the sheath being carried on in a reducing atmosphere.

8. An apparatus for forming a circumferentially and longitudinally seamless and homogeneous sheath upon a core which comprises means to form a molten body of a lead alloy capable of segregation, means to form the molten metal into oxide free solid particles chilled too rapidly for segregation to occur in the substance thereof, and means to heat the particles to a plastifying temperature too low to effect segregation therein, in combination with continuously operating means to advance a core and to simultaneously form and unite the heated particles by continuous extrusion under pressure into a continuously homogeneous elongated article, together with means to exclude oxygen from contact with the particles while being formed from the molten metal and being formed into the sheath.

9. An apparatus for forming a circumferentially and longitudinally seamless and homogeneous sheath upon a core which comprises means to form a molten body of a lead alloy capable of segregation, means to form the molten metal into oxide free solid particles chilled too rapidly for segregation to occur in the substance thereof, and means to heat the particles to a plastifying temperature too low to effect segregation therein, in combination with continuously operating means to advance a core and to simultaneously form and unite the heated particles by continuous extrusion under pressure into a continuously homogeneous elongated article, together with means to surround the particles with a non-oxidizing atmosphere while being formed from the molten metal and being formed into the sheath.

10. An apparatus for forming a circumferentially and longitudinally seamless and homogeneous sheath upon a core which comprises means to form a molten body of a lead alloy capable of segregation, means to form the molten metal into oxide free solid particles chilled too rapidly for segregation to occur in the substance thereof, and means to heat the particles to a plastifying temperature too low to effect segregation therein, in combination with continuously operating means to advance a core and to simultaneously form and unite the heated particles by continuous extrusion under pressure into a continuously homogeneous elongated article, together with means to surround the particles with a reducing atmosphere while being formed from the molten metal and being formed into the sheath.

GEORGE R. BROWN.